(12) United States Patent
Nagayama et al.

(10) Patent No.: US 7,691,000 B2
(45) Date of Patent: Apr. 6, 2010

(54) UNIVERSAL JOINT

(75) Inventors: Akihide Nagayama, Kashiba (JP);
Nobuo Komeyama, Nara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 245 days.

(21) Appl. No.: 11/662,138

(22) PCT Filed: Sep. 8, 2005

(86) PCT No.: PCT/JP2005/016530
§ 371 (c)(1),
(2), (4) Date: Mar. 8, 2007

(87) PCT Pub. No.: WO2006/028178
PCT Pub. Date: Mar. 16, 2006

(65) Prior Publication Data
US 2008/0032804 A1   Feb. 7, 2008

(30) Foreign Application Priority Data
Sep. 9, 2004   (JP) .............................. 2004-261976

(51) Int. Cl.
*F16D 3/00*   (2006.01)
(52) U.S. Cl. ....................... 464/130; 464/128
(58) Field of Classification Search ................ 464/134, 464/136, 128, 130; 403/57
See application file for complete search history.

(56) References Cited
U.S. PATENT DOCUMENTS 2,227,116 A * 12/1940 Wollner ...................... 464/130
2,698,527 A * 1/1955 Anderson .................... 464/130
4,090,796 A * 5/1978 Okuda et al. ................. 464/128
4,167,859 A * 9/1979 Okuda ......................... 464/128
5,451,470 A * 9/1995 Ashary et al. ................ 428/552

FOREIGN PATENT DOCUMENTS

| CN | 1023617 C | 1/1994 |
|---|---|---|
| JP | 1-106633 | 7/1989 |
| JP | 2-119522 | 9/1990 |
| JP | 11-294477 A | 10/1999 |
| JP | 2001-329356 | 11/2001 |

(Continued)

OTHER PUBLICATIONS

Chinese Office Action dated Mar. 28, 2008 with English Translation.
European Search Report dated Jun. 22, 2009.

*Primary Examiner*—Aaron M Dunwoody
(74) *Attorney, Agent, or Firm*—McGinn IP Law Group, PLLC

(57) ABSTRACT

There is provided a universal joint which is a universal joint of a block type in which a bearing cup for supporting a trunnion of a joint cross is integrally formed with a key portion, and the bearing cup is joined to be fixed to a yoke by a bolt in a state of fitting the key portion to a key way of the yoke, in which by forming WC—Ni—Cr thermally-sprayed coatings at both side surfaces of the key portion, corrosion resistance of the key portion is promoted, even when used over a long period of time in a drive system of a rolling mill or the like, a clearance between the key portion and the key way caused by corrosion of the key portion is prevented from being brought about, and a stable performance can be maintained over a long period of time by promoting service life of the bearing and preventing an excessively large bending load from being operated to the bolt.

3 Claims, 5 Drawing Sheets

FOREIGN PATENT DOCUMENTS

| | | |
|---|---|---|
| JP | 2001-355057 | 12/2001 |
| JP | 2002-181055 | 6/2002 |
| JP | 2002-181068 A | 6/2002 |
| JP | 2002-181069 | 6/2002 |

* cited by examiner

PRIOR ART

PRIOR ART

PRIOR ART

UNIVERSAL JOINT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION

1. Field of Invention

The present invention relates to a universal joint, particularly relates to a universal joint suitable for being used for a drive system operated with a high load such as a rolling mill or the like.

2. Background Art

A mechanism of driving, for example, a roll of a rolling mill is provided with a universal joint between a driving motor and the roll. There is known a universal joint of this kind referred to as a block type as shown in a disassembled perspective view of an essential portion thereof in FIG. 3, a sectional view of a trunnion portion orthogonal to an axis thereof in FIG. 4, and a sectional view taken along a line A-A thereof in FIG. 5, respectively (refer to, for example, Patent Reference 1).

The universal joint of the block type adopts a structure in which respective trunnions 11 of a joint cross 1 are supported by bearing cups 3 through rollers 2, and the respective bearing cups 3 are fixed to yokes 4 by bolts 5, respectively. The bearing cup 3 is integrally formed with a key portion 31 projected to a side of the yoke 4 at a joint surface thereof to the yoke 4, and by fitting the key portion 31 to a key way 41 formed at the yoke 4, a torque is transmitted thereby in cooperation with the bolt 5. That is, a rotational power of the yoke 4 on one side is transmitted to the bearing cup 3 through the trunnion 11 of the joint cross 1 as a load at a position indicated by an arrow mark in FIG. 4 and is transmitted to the yoke 4 on other side by an axial force of the bolt 5 and a surface pressure between the key portion 31 and the key way 41. As a material of the bearing cup 3, carburized and quenched steel of, for example, SNCM or the like is used in consideration of a shock resistant load performance as a bearing ring of the bearing.

The universal joint of the block type achieves an advantage that a number of pieces of parts is small and the bearing cup is not creeped in view of a structure thereof in comparison with other type of a universal joint such as around type in which a bearing cup in a cylindrical shape is fixed to a yoke by a member referred to as a bearing holder of a separate member.

Patent Reference: JP-A-2002-181069

BRIEF SUMMARY OF THE INVENTION

Problems that the Invention is to Solve

Meanwhile, when the above-described block type universal joint is used in the drive system of the roll of the rolling mill, there poses a problem that a high surface pressure is operated between a side surface of the key portion 31 and an inner wall surface of the key way 41, at the same time, these are easy to be corroded since these are exposed to cooling water. Although the corrosion can be prevented from being brought about by cladding stainless steel to the key way 41, since the bearing block 3 comprises carburized and quenched steel, the cladding of stainless steel cannot be carried out and there is a case in which the bearing block 3 is corroded by a long time period of use and a clearance is produced between the key portion 31 and the key way 41. When such a clearance is produced, there is also a possibility that a clearance effects an influence on service life of the bearing supporting the trunnion 11 and the bolt 5 is operated with an excessively large bending stress to be destructed.

The invention has been carried out in view of such an actual situation and it is a problem thereof to provide a universal joint of a block type in which a key portion of a bearing cup is not corroded and a stable function can be achieved over a longer period of time even when the universal joint is operated with a high load as in a drive system of a rolling mill or the like and used under an environment in which the universal joint is easy to be corroded.

Means for Solving the Problem

In order to resolve the above-described problem, a universal joint of the invention is characterized in a universal joint in which a bearing cup for supporting a trunnion of a joint cross respectively through a needle roller is formed by carburized and quenched steel and joined to be fixed to a yoke by a bolt, a surface of the bearing cup joined to the yoke is formed with a key portion projected toward the yoke, and the yoke is formed with a key way fitted to the key portion, wherein side surfaces of the key portions are covered with WC—Ni—Cr thermally-sprayed coatings.

Here, according to the universal joint of the invention, a constitution in which the WC—Ni—Cr thermally-sprayed coating is subjected to a sealing processing using a silica species resin can preferably be adopted.

Further, according to the universal joint of the invention, it is preferable to adopt a constitution in which an inner surface of the key way of the yoke is covered with a clad layer comprising a stainless steel alloy.

The invention has been carried out as a result of intensively carrying out a research on a thermally spraying material which covers a surface of carburized and quenched steel to promote corrosion resistance and is not exfoliated by operation of a high surface pressure, it is confirmed that a WC—Ni—Cr (tungsten carbide-nickel-chromium) thermally-sprayed coating is excellent in corrosion resistance by a salt water spray test, mentioned later, further, it is confirmed that even when sprayed to the surface of carburized and quenched steel of SNCM or the like and loaded with a high surface pressure, an inner crack is difficult to be brought about and exfoliation is difficult to be brought about in the coating to show excellent durability by using the coating in a drive system, of a roller of a rolling mill or the like by a static surface pressure loading test, similarly mentioned later.

Further, by subjecting the WC—Ni—Cr thermally-sprayed coating to the sealing processing using the silica species resin, the above-described performance is achieved over a long period of time by closing a small hole formed at the thermally-sprayed coating and restraining invasion of water or the like from the small hole.

Further, with regard to the key way formed on the side of the yoke corrosion on the side of the key way can be prevented by covering the inner surface by the clad layer comprising the stainless steel alloy, and a problem is not particularly posed with regard to a relationship thereof with the WC—Ni—Cr thermally-sprayed coating on the side of the key portion.

Advantage of the Invention

According to the invention, in the universal joint of the block type having a small number of pieces of parts, the both side surfaces of the key portion formed at the bearing cup comprising carburized quenched steel are formed with the WC—Ni—Cr thermally-sprayed coating and therefore, even when used under a severe environment of being exposed to water or the like under the high load as in the drive system of the rolling mill or the like, the key portion can be prevented from being corroded, further, a drawback of producing a crack or producing exfoliation in the thermally-sprayed coating is not brought about and the stable performance can be achieved over a long period of time.

DETAILED SUMMARY OF THE INVENTION

An embodiment of the invention will be described with reference to the drawings as follows.

Figure 1:
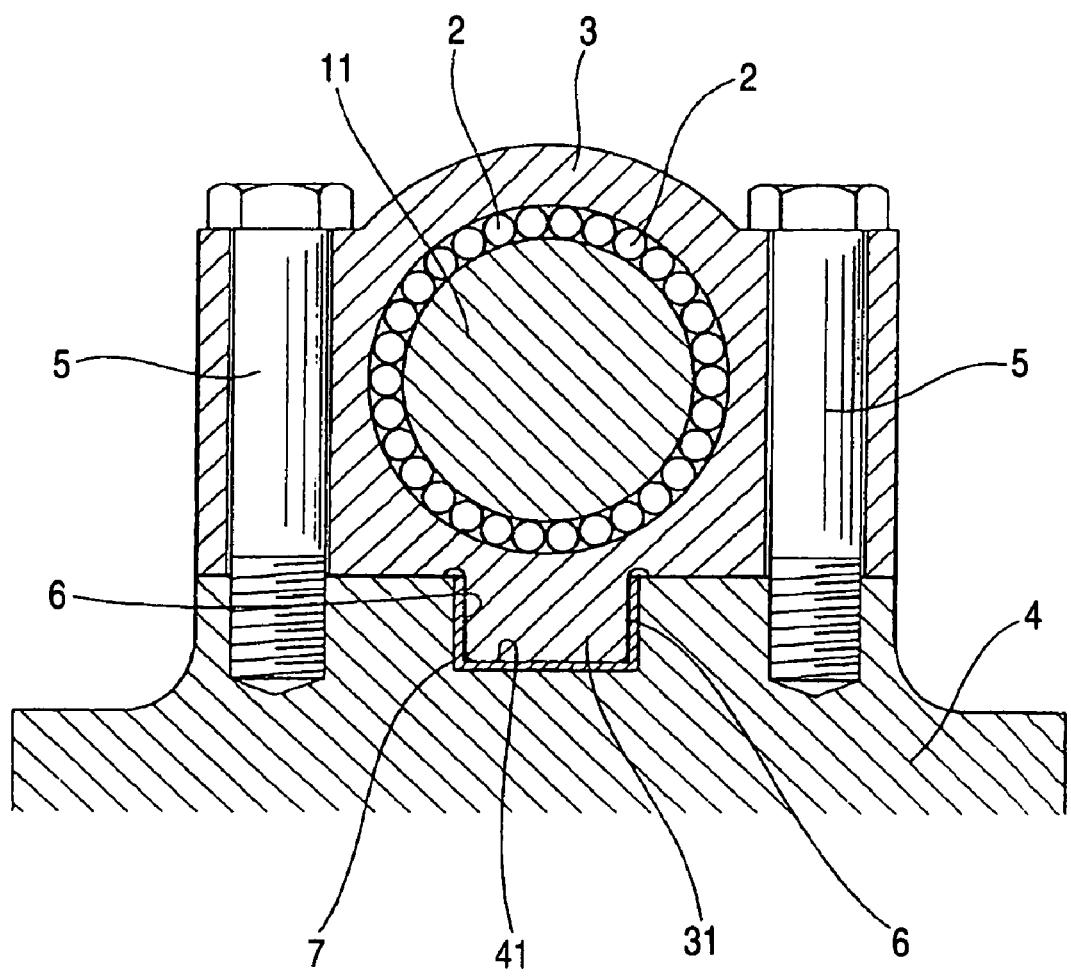
FIG. 1 is a sectional view of a trunnion and a bearing cup orthogonal to an axis thereof according to an embodiment of the invention.
Figure 2:
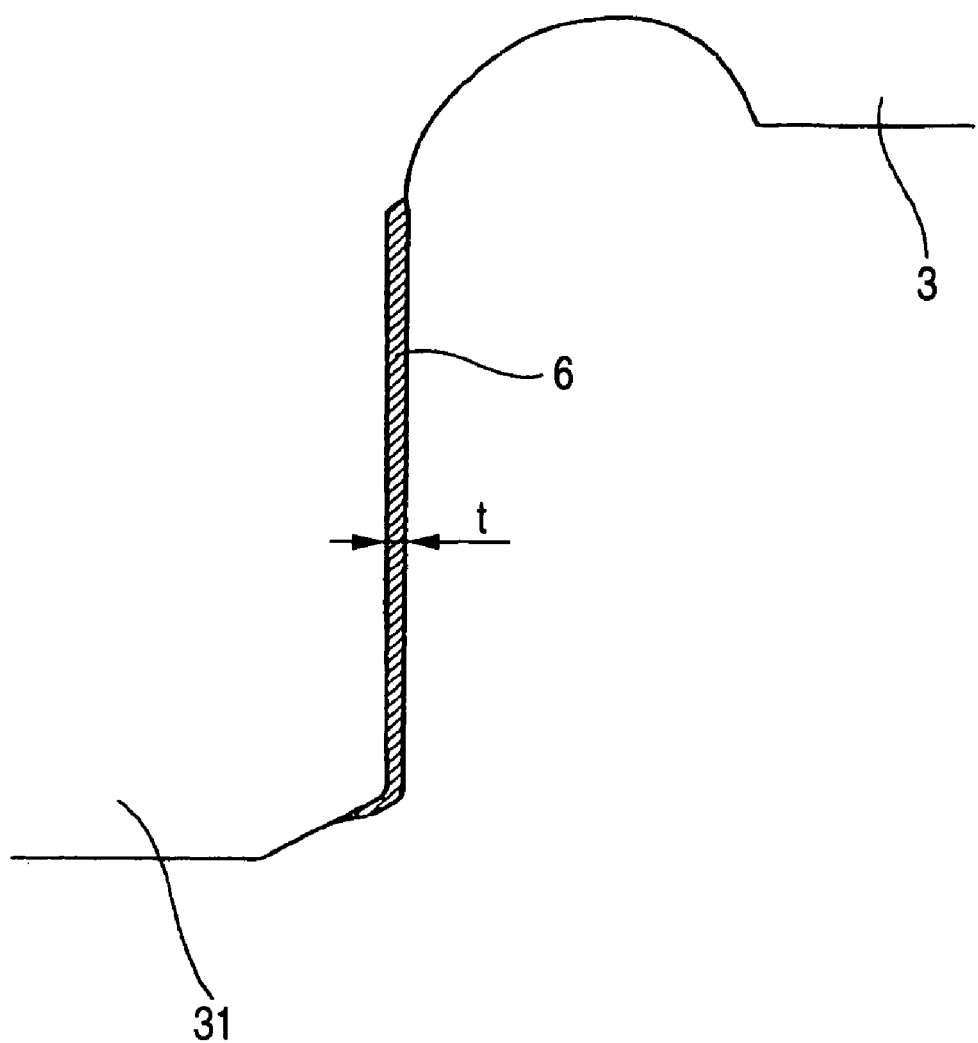
FIG. 2 is a view enlarging a side surface of a key portion of the bearing cup in FIG. 2.

FIG. 1 is a sectional view of a trunnion and a bearing cup according to an embodiment of the invention orthogonal to an axis thereof, and FIG. 2 is a view enlarging a side surface of a key portion of the bearing cup.

Figure 3:
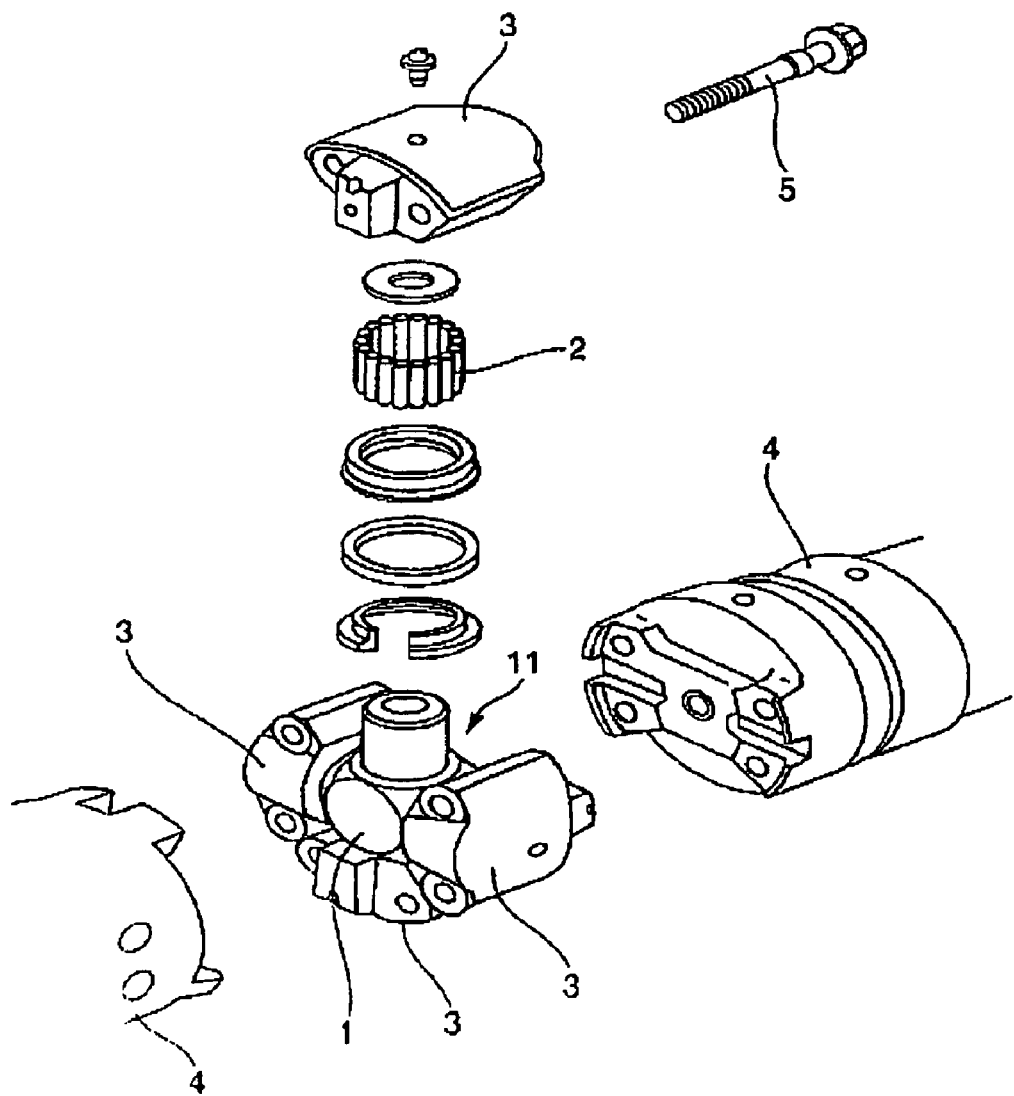
FIG. 3 is a disassembled perspective view of an essential portion of a universal joint of a block type.
Figure 4:
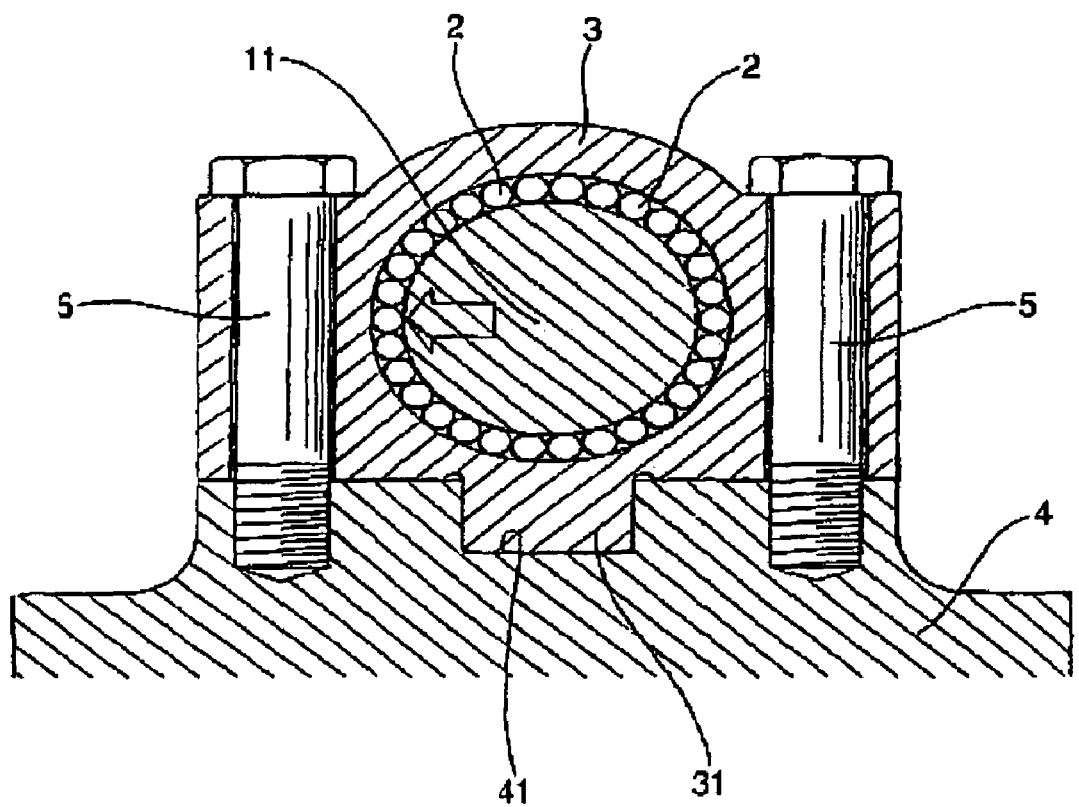
FIG. 4 is a sectional view of vicinities of a trunnion 11 and a bearing cup 3 of a background art orthogonal to an axis thereof.
Figure 5:
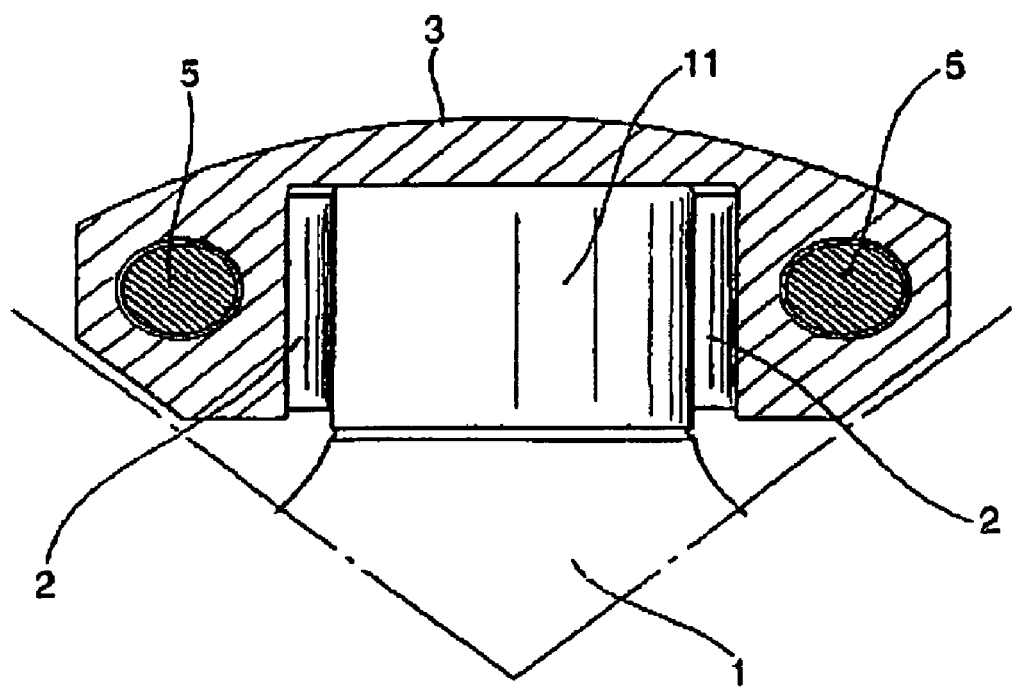
FIG. 5 is a view in mounting a roller 2 and the trunnion 11 of a joint cross 1 in a sectional view of the bearing cup 3 and a bolt 5.

A total basic structure of the embodiment is equivalent to that of the background art shown in FIG. 3 through FIG. 5. That is, the respective trunnions 11 of the joint cross 1 are supported by the bearing cups 3 made of carburized and quenched steel via the roller 2, the bearing cup 3 is joined to be fixed to the yoke 4 by the bolt 5, the surface of the bearing cup 3 joined to the yoke 4 is integrally formed with the key portion 31, and the yoke 4 is formed with the key way 41 fitted with the key portion 31. The material of the bearing cup 3 is made of, for example, nickel chromium molybdenum steel designated as SNCM815 in Japanese Industrial Standards (JIS), and the material of the yoke 4 is made of, for example, chromium molybdenum steel designated as SCM440, or made of nickel chromium molybdenum steel designated as SNCM439.

A characteristic of the embodiment resides in that the both side surfaces of the key portion 31 of the bearing cup 3 are formed with WC—Ni—Cr thermally-sprayed coatings 6, further, an inner surface of the key way 41 of the yoke 4 is formed with a clad layer 7 using stainless steel (for example, 13% chromium series stainless steel).

For example, WC-27NiCr (a basic component of which comprises WC and which includes 27% of NiCr) can preferably be used for the WC—Ni—Cr thermally-sprayed coating 6, and it is preferable that a coating thickness t thereof is made to be about 0.1 through 0.3 mm. Further, in order to maintain corrosion resistance over a long period of time, it is preferable to subject the WC—Ni—Cr thermally-sprayed coating 6 to a sealing processing by a silica species resin to seal a small hole in the coating. Further, since the coating thickness of the WC—Ni—Cr thermally-sprayed coating 6 can be controlled with high accuracy, from a view point of preventing a deterioration in a performance of adhering to a base metal by carrying out a post treating after thermal spray, it is preferable not to carry out the post treating.

By forming the above-described thermally-sprayed coating 6, even used over a long period of time under a severe environment of the drive system of the rolling mill or the like, a drawback of cracking or exfoliating the thermally-sprayed coating 6 is not brought about and the key portion 31 is not corroded. Further, since the inner surface of the key way 41 is formed with the clad layer 7 by stainless steel and therefore, also the side of the key way 41 is not corroded. Therefore, a clearance can be restrained from being produced between the key portion 31 and the key way 41 even by a long period of use, service life of the bearing of the trunnion 11 is increased, an excessively large bending stress is not operated to the bolt 5, and the function of the universal joint can be maintained over a long period of time.

As a result of a field test used in an actual machine of the drive system of the rolling mill, according to the universal joint of the embodiment of the invention applying the WC—Ni—Cr thermally-sprayed coatings 6 (WC-27NiCr) to the both side surfaces of the key portion 31 of the bearing cup 3, a change is not observed in a width dimension of the key portion 31 even by use over 20 months. In contrast thereto, according to the universal joint of the background art which is not provided with the WC—Ni—Cr thermally-sprayed coating 6, the width dimension of the key portion 31 is reduced by 1.52 mm by corrosive wear by use over 13 months.

Further, a result of carrying out a bench test of corrosion resistance and surface pressure resistance performance with regard to the above-described WC—Ni—Cr (WC-27NiCr) thermally-sprayed coating along with comparative examples is shown below.

With regard to corrosion resistance, a salt water spray test shown below is carried out.

As a test piece, a plate made of SNCM815 having a diameter of 80 mm which is carburized and quenched is used, and there are prepared the plate formed with a WC—Ni—Cr thermally-sprayed coating using WC-27NiCr at a surface thereof by a coating thickness of 0.1 mm (embodiment) as well as the plate formed with an Ni thermally-sprayed coating at the surface by a coating thickness of 0.2 mm (comparative example 1), and the plate surface of which is not formed with a coating at all (comparative example 2).

Test conditions are constituted by humidity at inside of the tester of 98%, a temperature at inside of the tester of 35° C., a salt water concentration of 5%, and an angle of a test face of 45° relative to a horizontal face, and a continuous test of 200 hours is carried out. The result is shown in Table 1.

TABLE 1

| test piece | embodiment (WC—Ni—Cr thermal spray) | comparative example 1 (Ni thermal spray) | comparative example 2 (no coating) |
|---|---|---|---|
| evaluation | ○ | ○ | x |

In Table 1, x designates considerable corrosion, ○ designates no corrosion. As is apparent from [Table 1], it is known that corrosion resistance is excellent in both of the WC—Ni—Cr thermally-sprayed coating and the Ni thermally-sprayed coating in comparison with the case of no coating.

Next, with regard to the embodiment and comparative example 1 excellent in corrosion resistance, a surface pressure distance test shown below is carried out.

As a test piece, a plate made of SNCM1815 having a diameter of 61 mm which is carburized and quenched is used, and there are prepared the plate formed with the WC—Ni—Cr thermally-sprayed coating having the thickness of 0.1 mm (embodiment) and the plate similarly formed with the Ni thermally-sprayed coating having the thickness of 0.2 mm (comparative example 1) similar to the above-described.

As test conditions, an Amsler tester is used, the test pieces are loaded respectively for 30 seconds under a high surface pressure of a static surface pressure of 392 MPa, and a situation of exfoliating the coating is observed. Further, the static surface pressure of 392 MPa or higher is a high load condition for the universal joint and the test is carried out here by the static surface pressure of 392 MPa. The result is shown in Table 2.

TABLE 2

| surface pressure (MPa) | 392 |
|---|---|
| embodiment (WC—Ni—Cr thermal spray) | ○ |
| comparative example 1 (Ni thermal spray) | x |

In table 2, x designates exfoliation, and ○ designates no exfoliation. As is apparent from Table 2, whereas the WC—Ni—Cr thermally-sprayed coating is not exfoliated at all under the high pressure of 392 MPa, the Ni thermally-sprayed coating is exfoliated and it is confirmed that the performance of the WC—Ni—Cr thermally-sprayed coating adhering to carburized and quenched steel is excellent.

The invention claimed is:

1. A universal joint comprising:
a joint cross including a trunnion;
a bearing cup, made of carburized and quenched steel, for supporting the trunnion through a needle roller; and
a yoke to which the bearing cup is fixed by a bolt,
wherein a surface of the bearing cup joined to the yoke comprises a key portion projected toward the yoke, and the yoke comprises a key way fitted to the key portion,
wherein carburized and quenched side surfaces of the key portion is covered with WC—Ni—Cr (tungsten carbide-nickel-chromium) thermally-sprayed coatings, and
wherein the WC—Ni—Cr thermally-sprayed coatings comprise a thickness of 0.1 mm to 0.3 mm.

2. The universal joint according to claim 1, wherein the WC—Ni—Cr thermally-sprayed coating is subjected to a sealing process comprising a silica species resin.

3. The universal joint according to claim 1, wherein an inner surface of the key way of the yoke is covered with a clad layer comprising a stainless steel alloy.

* * * * *